(12) United States Patent
Leplus et al.

(10) Patent No.: US 12,217,052 B2
(45) Date of Patent: Feb. 4, 2025

(54) GENERATING MASKS FROM DECODED INSTRUCTIONS TO APPLY TO FETCHED INSTRUCTIONS FOR UNMASKING

(71) Applicant: Commissariat à l'Energie Atomique et aux Energies Alternatives, Paris (FR)

(72) Inventors: Gaëtan Leplus, Grenoble (FR); Olivier Savry, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 95 days.

(21) Appl. No.: 17/656,058

(22) Filed: Mar. 23, 2022

(65) Prior Publication Data
US 2022/0357944 A1 Nov. 10, 2022

(30) Foreign Application Priority Data
May 10, 2021 (FR) ..................................... 21 04896

(51) Int. Cl.
*G06F 9/30* (2018.01)
*G06F 9/22* (2006.01)
*G06F 9/24* (2006.01)
*G06F 9/38* (2018.01)

(52) U.S. Cl.
CPC ................ *G06F 9/24* (2013.01); *G06F 9/223* (2013.01); *G06F 9/3005* (2013.01); *G06F 9/30185* (2013.01); *G06F 9/3818* (2013.01)

(58) Field of Classification Search
CPC ... G06F 9/3005; G06F 9/3818; G06F 9/30185
See application file for complete search history.

(56) References Cited

U.S. PATENT DOCUMENTS

| 5,381,360 A * | 1/1995 | Shridhar | G06F 9/3552 |
| | | | 712/E9.043 |
| 2010/0070953 A1* | 3/2010 | Velten | G06F 21/125 |
| | | | 717/140 |
| 2016/0105282 A1* | 4/2016 | Henry | G06F 9/30003 |
| | | | 713/190 |

(Continued)

FOREIGN PATENT DOCUMENTS

EP 3 736 719 A1 11/2020

OTHER PUBLICATIONS

Mario Werner et al., "Sponge-Based Control-Flow Protection for IoT Devices", Feb. 19, 2018, 13 pages.

(Continued)

*Primary Examiner* — Jacob Petranek
(74) *Attorney, Agent, or Firm* — Oblon, McClelland, Maier & Neustadt, L.L.P.

(57) ABSTRACT

A method for executing a machine code using a microprocessor includes, after an operation of decoding a current loaded instruction, constructing a mask from the signals generated by an instruction decoder in response to decoding of the current loaded instruction by the decoder. The constructed mask varies as a function of the current loaded instruction. Subsequently, before an operation of decoding a next loaded instruction, the next loaded instruction is unmasked using the constructed mask.

6 Claims, 3 Drawing Sheets

(56) References Cited

U.S. PATENT DOCUMENTS

2020/0272475 A1* 8/2020 Courousse .......... G06F 9/30076
2020/0349294 A1 11/2020 Savry

OTHER PUBLICATIONS

French Preliminary Search Report Issued Nov. 19, 2021 in French Application 21 04896 filed on May 10, 2021 (with English Translation of Categories of Cited Documents & Written Opinion), 11 pages.
Savry et al., "CONFIDAENT: Control Flow Protection with Instruction and Data Authenticated Encryption", 2020 23rd Euromicro Conference on Digital System Design (DSD), Aug. 26, 2020, 8 Pages.

* cited by examiner

GENERATING MASKS FROM DECODED INSTRUCTIONS TO APPLY TO FETCHED INSTRUCTIONS FOR UNMASKING

The invention relates to a method for executing a machine code by means of a microprocessor, and to the machine code executed using this method. The invention also relates to:
- a data-storage medium and microprocessor for implementing this executing method, and
- a compiler for generating this machine code.

To obtain information on a machine code or to cause the machine code to operate in an unexpected way, it is known to subject it to fault attacks or fault injection. These attacks involve disrupting the operation of the microprocessor during execution of the machine code, using various physical means such as modifying supply voltages, modifying the clock signal, exposing the microprocessor to electromagnetic waves, inter alia.

Using such disruptions, an attacker is able to compromise the integrity of machine instructions or data in order for example to recover a secret key of a cryptographic system, bypass security mechanisms such as verification of a PIN code during authentication, or simply prevent the execution of a function essential to the security of a critical system.

A fault attack may compromise the operation of the microprocessor, for example, via modification of the instructions that are executed by the arithmetic logic unit. To this end, the injected faults commonly aim to disrupt operation of the instruction decoder of the microprocessor in order to produce corrupted instructions. A fault attack may also seek to disrupt the operation of the arithmetic logic unit of the microprocessor.

Skipped instructions may be spoken of when the decoder disruption merely prevents execution of one or more of the instructions of the machine code or when the compromisation has an effect on the processor equivalent to non-execution of the corrupted instruction. Replaced instructions may be spoken of when the decoder disruption causes one or more of the instructions of the machine code to be replaced with other instructions executable by the microprocessor.

When the decoder disruption modifies a branch instruction or when the disruption of the arithmetic logic unit consists in skipping a branch instruction, the control flow is hijacked. The control flow corresponds to the execution path that is followed when the machine code is executed. The control flow is conventionally depicted in the form of an oriented graph known as the "control flow graph". Control-flow hijack occurs when a branch instruction is compromised or when the condition involved in a conditional branch instruction is modified or when the return address of a function is modified.

To make execution of machine code more robust to such compromisations, it has already been proposed to add to the machine code instructions that allow these compromisations to be detected when they occur. For example, patent application US20200272475 describes such a solution. This solution works well but requires many instructions to be added to the machine code. In addition, it does not necessarily allow a compromisation of an instruction that occurs when this instruction is decoded by the microprocessor to be detected.

Prior art is also known from EP3736719A1, and from the following article: Savry Olivier et al.: "Confidant: Control Flow protection with Instruction and Data Authenticated Encryption", 23RD EUORMICRO Conference On Digital System Design, Aug. 6, 2020, pages 246-253. This prior art also does not allow a compromisation of an instruction that occurs when this instruction is decoded by the microprocessor to be detected.

The invention aims to provide a method for executing a machine code that allows a compromisation of an instruction, a skipped instruction and a compromisation of operation of the instruction decoder of the microprocessor to be signalled. Therefore, one subject thereof is such a method for executing a machine code.

Another subject of the invention is a machine code.

Another subject of the invention is a data-storage medium that is readable by a microprocessor, this data-storage medium containing the above machine code.

Another subject of the invention is a microprocessor for implementing the above executing method.

Lastly, another subject of the invention is a compiler able to automatically convert a source code of a computer program into a machine code as claimed.

The invention will be better understood on reading the following description, which is given solely by way of non-limiting example, with reference to the drawings, in which.

Section I: Notations and Definitions

Figure 1:
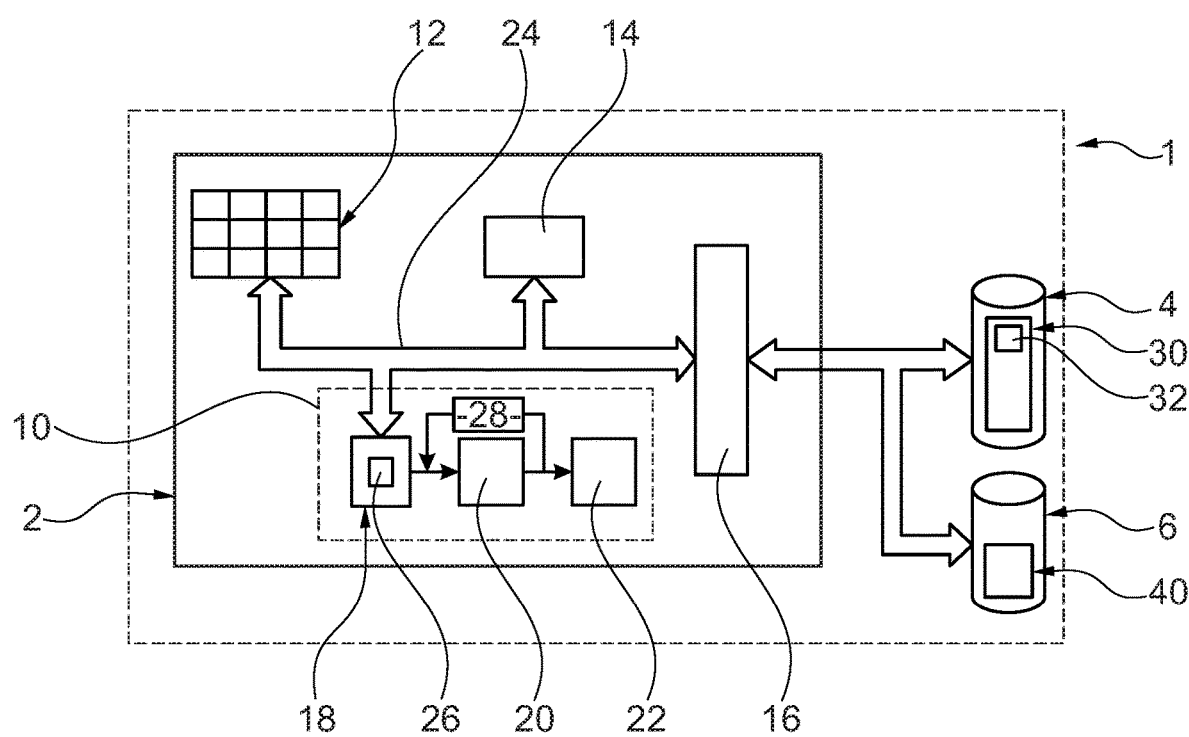
FIG. 1 is a schematic illustration of the architecture of an electronic apparatus able to execute a machine code.

In these figures, the same references have been used to designate the same elements. In the rest of this description, features and functions that are well known to those skilled in the art will not be described in detail.

In this description, the following definitions have been adopted.

A "program" designates a set of one or more pre-set functions that it is desired to have executed by a microprocessor.

A "source code" is a representation of the program in a computer language, not being able to be executed directly by a microprocessor and being intended to be converted, by a compiler, into a machine code able to be executed directly by the microprocessor.

A program or a code is said to be "able to be executed directly" or "directly executable" when it is able to be executed by a microprocessor without this microprocessor needing to compile it beforehand by way of a compiler or to interpret it by way of an interpreter.

An "instruction" denotes a machine instruction able to be executed by a microprocessor. Such an instruction consists:
- of an opcode, or operation code, that codes the nature of the operation to be executed, and
- of one or more operands defining the value(s) of the parameters of this operation.

The "value of an instruction" is a digital value obtained, using a bijective function, from the succession of "0"s and "1"s that code, in machine language, this instruction. This bijective function may be the identity function.

A "machine code" is a set of machine instructions. It typically is a file containing a sequence of bits with the value "0" or "1", these bits coding the instructions to be executed by the microprocessor. The machine code is able to be executed directly by the microprocessor, that is to say without the need for a preliminary compilation or interpretation. The machine code comprises a succession of instructions organized one after another and that forms an ordered sequence of instructions in the machine code. The machine code starts with an initial instruction and ends with a final instruction. With respect to a given instruction $I_i$ of the machine code, the instruction $I_{i-1}$ located on the side of the initial instruction is called the "previous instruction" and the instruction $I_{i+1}$ located on the side of the final instruction is called the "following instruction". The index "i" is the order number of instruction $I_i$ in the machine code. In this text, this machine code is divided into a sequence of basic blocks that are immediately consecutive or separated by data blocks.

A "binary code" is a file containing a sequence of bits bearing the value "0" or "1". These bits code data and instructions to be executed by the microprocessor. The binary code thus comprises at least one machine code and also, in general, digital data processed by this machine code.

An "instruction stream" is a succession of instructions executed one after the other.

In this text, a "basic block" is a group of instructions of the machine code that are systematically executed one after the other. A basic block starts at a branch address and ends with a single explicit or implicit branch instruction. An explicit branch instruction is characterized by the explicit presence of an opcode in the machine code that codes the branch instruction. An implicit branch instruction corresponds to the case where execution of a previous basic block systematically continues with execution of a following basic block located, in the machine code, immediately after the previous basic block. In this case, given that in the absence of explicit branch instruction the instructions of the machine code are executed in order one after the other, it is not necessary to insert, at the end of the previous basic block, an explicit instruction to branch to the following basic block. In this description, the previous basic block is, in this case, said to end with an implicit branch instruction because this instruction is not explicitly coded into the machine code. In this case, the previous basic block ends just before the branch address of the following basic block.

In this patent application, the expression "branch instruction" designates an explicit branch instruction unless otherwise mentioned. The execution of a basic block thus systematically starts with the execution of the instruction located at its branch address and systematically ends with the execution of the branch instruction that ends this basic block. A basic block does not contain any other branch instructions than the one situated at the end of this basic block. The instructions of a basic block are thus systematically all executed by the microprocessor one after another in the order in which they are present in this basic block. The branch instruction, when it is executed, may systematically direct the control flow to the same branch address or, alternatively, to different branch addresses. The latter scenario occurs for example when, at the end of the executed basic block, the control flow is able to continue to a first and, alternatively, to a second basic block.

A "branch instruction" is an instruction that, when it is executed by the microprocessor, triggers a jump to the branch address of another basic block. This branch instruction therefore comprises at least as parameter the branch address of this other basic block. Typically, for this purpose, this instruction replaces the current value of the program counter with the value of the branch address. It is recalled that the program counter contains the address of the next instruction to be executed by the microprocessor. In the absence of a branch instruction, each time an instruction is executed, the program counter is incremented by the size of the instruction currently being executed. In the absence of a branch instruction, the instructions are systematically executed sequentially one after another in the order in which they are recorded in a main memory, i.e. in the order of their index "i". The branch instruction may be unconditional, that is to say that the jump to the branch address is performed systematically as soon as this instruction is executed. An unconditional branch instruction is for example the instruction "JMP" in assembly language for microprocessors of the x86 series. The branch instruction may also be conditional, that is to say that the jump to the branch address is triggered when it is executed only if a particular condition is met. For example, a conditional branch instruction is a "JE", "JA" or "JNE" instruction in assembly language. The branch instruction may equally be a call to a function. In this text, the term "branch instruction" denotes both direct and indirect branch instructions. A direct branch instruction is a branch instruction that directly contains the numerical value of the branch address. An indirect branch instruction is a branch instruction to a branch address contained in a memory or a register of the microprocessor. Thus, unlike a direct branch instruction, an indirect branch instruction does not directly contain the numerical value of the branch address.

A "branch address" is the address in the main memory where the first executed instruction of a basic block is located. Below, reference will be made to a branch address even with respect to basic blocks the first instruction of which is executed following execution of an implicit branch instruction.

The expression "execution of a function" is understood to designate execution of the instructions making up this function.

Section II: Examples of Embodiment

FIG. 1 shows an electronic apparatus 1 comprising a microprocessor 2, a main memory 4 and a mass storage medium 6. For example, the apparatus 1 is a computer, a smartphone, an electronic tablet, a chip card or the like.

The microprocessor 2 here comprises:
a hardware pipeline 10 for processing the instructions to be executed;
a set 12 of registers;
a control module 14; and
a data input/output interface 16.

The memory 4 is configured so as to store instructions of a binary code 30 of a program to be executed by the microprocessor 2. The memory 4 is a random access memory. The memory 4 is typically a volatile memory. The memory 4 may be a memory external to the microprocessor 2, as shown in FIG. 1. In this case, the memory 4 is, for example, formed on a substrate that is mechanically separate from the substrate on which the various elements of the microprocessor 2, such as the pipeline 10, are formed.

In this example of embodiment, the binary code 30 in particular comprises a machine code 32.

By way of illustration, the microprocessor 2 has an ARMv7 (Advanced RISC Machines—version 7) architecture and supports instruction sets such as Thumb1 and/or Thumb2. An instruction set defines in a limited manner the syntax of the instructions that the microprocessor 2 is capable of executing. This instruction set therefore in particular defines all of the opcodes possible for an instruction. The syntax of an instruction is incorrect if its syntax corresponds to none of the possible syntaxes of an instruction executable by the microprocessor 2. For example, if the bit range of an instruction $I_d$ that corresponds to the bit range used to code the opcode of the instruction contains a value that is different from all the possible values of an opcode, then its syntax is incorrect.

The pipeline 10 allows an instruction of the machine code to be executed while processing, by the pipeline 10, of the previous instruction of this machine code has not yet ended. Such processing pipelines are well-known and only elements of the pipeline 10 that are required to understand the invention will be described in detail.

The pipeline 10 typically comprises the following stages:
an instruction loader 18,
an instruction decoder 20, and
an arithmetic logic unit 22 that executes the instructions.

The loader 18 loads the next instruction to be executed by the unit 22 from the memory 4. More precisely, the loader 18 loads the instruction of the machine code 32 to which a program counter 26 points. Unless its value is modified by executing a branch instruction, the value of the program counter 26 is incremented by a regular increment on each cycle of a clock of the microprocessor. The regular increment is equal to the difference between the addresses of two immediately consecutive instructions in the machine code 32. This amount is called the "unit increment" below.

The decoder 20 decodes the instruction loaded by the loader 18 to obtain configuration signals that configure the microprocessor 2 so that it executes, in the next clock cycle, the loaded instruction. One of these configurations signals codes the nature of the operation to be executed by the unit 22. This configuration signal corresponds to the opcode of the loaded instruction. Other configuration signals indicate, for example, whether the loaded instruction is an instruction to load a datum from the memory 4 or to write a datum to the memory 4. These configuration signals are transmitted to the unit 22. Other configuration signals comprise the values of the loaded operands. Depending on the instruction to be executed, the signals are transmitted to the set 12 of registers or to the unit 22.

When the decoder 20 is unable to decode an instruction, it generates an error signal. Typically, this occurs if the syntax of the loaded instruction is incorrect.

The unit 22 executes the loaded instructions one after another. The unit 22 is also capable of storing the result of these executed instructions in one or more of the registers of the set 12.

In this description, "execution by the microprocessor 2" and "execution by the unit 10" will be used synonymously.

A given instruction $I_i$ of the machine code must successively be processed, in order, by the loader 18, the decoder 20 and the unit 22. In addition, the loader 18, the decoder 20 and the unit 22 are capable of working in parallel with one another. Thus, at a given time, the loader 18 may be in the process of loading the following instruction $I_{i+1}$, the decoder 20 in the process of decoding the instruction $I_i$ and the unit 22 in the process of executing the previous instruction $I_{i-1}$. The pipeline 10 thus allows at least three instructions of the machine code 30 to be processed in parallel.

In addition, the pipeline 10 comprises a hardware module 28 for unmasking the instructions loaded by the loader 18.

The module 28 is capable of automatically executing the following operations:
1) in response to decoding, by the decoder 20, of an instruction $I_i$, the module 28 constructs a mask $M_i$,
2) before starting to decode the following instruction $I_{i+1}$, the module unmasks the instruction $I_{i+1}$, using a current mask $M_c$ chosen from the group made up of the constructed mask $M_i$ and of a jump mask MJ, before transmitting the unmasked instruction to the decoder 20.

To carry out operation 1) above, the module 28 implements and executes a pre-programmed function $F_{CM}(i_i)$. To carry out operation 2) above, the module 28 implements and executes a pre-programmed demasking function $F_D(i^*_{i+1}, M_c)$, where:
$M_c$ is the current mask chosen from the group made up of the constructed mask $M_i$ and of the jump mask MJ, and
$I^*_{i+1}$ is the masked instruction $I_{i+1}$, i.e. the instruction such as it is before being unmasked by the module 28.

Below, the notation "I*" designates the instruction I masked and the notation "I", without the symbol "*", designates the instruction I in the clear, or the cleartext instruction, i.e. the result of the function $F_D(i^*; M_c)$.

These functions $F_{CM}( )$ and $F_D( )$ are secret functions. To this end, there is no machine code for executing these functions in a memory located outside of the microprocessor 2. Typically, they are implemented in hardware form inside the module 28.

The function $F_{CM}( )$ is a function that constructs the mask $M_i$ from the configuration signals generated by the decoder 20 when the instruction $I_i$ is decoded. Here, the mask $M_i$ is coded on the same number of bits as the instruction $I_i$.

In this embodiment, the function $F_D( )$ is a function that combines each bit of the instruction $I^*_{i+1}$ with the bits located in the same locations in the current mask $M_c$. Here, the function $F_D( )$ is defined by the following relationship: $I_{i+1} = I^*_{i+i}$ XOR $M_c$, where the symbol "XOR" designates the "EXCLUSIVE OR" logic operation.

In this example of embodiment, the set 12 comprises general registers that are usable to store any type of data, and dedicated registers. In contrast to the general registers, the dedicated registers are dedicated to storing particular data that are generally automatically generated by the microprocessor 2.

The module 14 is configured so as to move data between the set 12 of registers and the interface 16. The interface 16 is notably able to acquire data and instructions, for example from the memory 4 and/or the medium 6 that are external to the microprocessor 2.

The microprocessor 2 here comprises a bus 24 that links the various components of the microprocessor 2 to one another.

The medium 6 is typically a non-volatile memory. It is for example an EEPROM or Flash memory. Here, it contains a backup copy 40 of the binary code 30. It is typically this copy 40 that is automatically copied to the memory 4 to restore the code 30, for example after a loss of current or the like or just before the execution of the code 30 starts.

The machine code 32 is formed of a sequence of basic blocks that have to be executed one after another.

Figure 2:
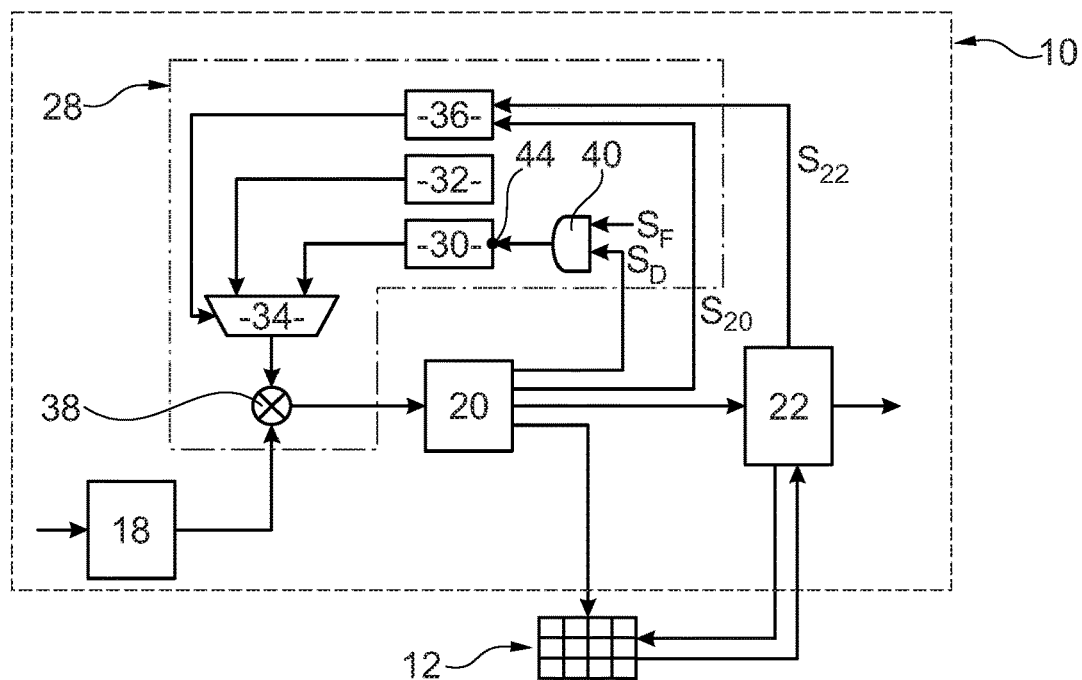
FIG. 2 is a schematic illustration of the architecture of a processing pipeline of the apparatus of FIG. 1.

FIG. 2 represents in more detail an example of embodiment of the module 28. The module 28 comprises:
a register 30 in which is stored the mask $M_i$ constructed from the configuration signals generated by the decoder 20 at the end of decoding of the instruction $I_i$,
a register 32 in which is stored the mask MJ,
a multiplexer 34 comprising two inputs for receiving the mask $M_i$ and the mask MJ, respectively,
a control circuit 36 that selects, depending on the various received signals, the current mask $M_c$, from the masks $M_i$ and MJ, that will be delivered to the output of the multiplexer 34, a logic gate 38 that XOR's the current mask $M_c$ delivered to the output of the multiplexer 34 and the instruction $I_{i+1}$ loaded by the loader 18, and a logic gate 40 that NAND's a signal $S_F$ and a signal $S_D$ and delivers, to an output, the result of this logic operation.

The signal $S_F$ is a Boolean signal that takes the value "1" when operation of the decoder 20 is interrupted for a plurality of clock cycles. Such an interruption is for example necessary when waiting for the result of other computations, for example, carried out by the unit 22. This particular case occurs for example when a conditional branch instruction is executed. Specifically, in this case, it is not possible to indicate to the charger 18 which is the next instruction to be loaded until it is known whether the execution of this conditional branch instruction will cause or not a jump of a plurality of instructions of the machine code 32.

The signal $S_D$ is a Boolean signal that takes the value "1" when decoding of the instruction has ended and the configuration signals are ready to be used to execute this instruction.

Thus, the signal output from the gate 40 takes the value "0" only when operation of the loader 18 and decoder 20 has been interrupted and configuration signals generated by the decoder 20 are ready to be used.

An input 44 of the register 30 is connected to the output of the gate 40. Provided that this input 44 receives a signal equal to "1", in each clock cycle, the register 30 stores the value of the configuration signals generated by the decoder 20. The value stored in the register 30 is coded on as many bits as there are bits in the mask $M_i$. Here, the value stored in the register 30 is the value of the mask $M_i$ constructed in response to decoding of the instruction $I_i$ by the decoder 20. In contrast, when the input 44 receives a signal equal to "0", no new value is stored in the register 30. Thus, in the latter case, the last mask $M_i$ constructed is stored in memory for a plurality of clock cycles and in particular as long as the signal $S_F$ is equal to "1".

The circuit 36 selects the register 32 if the instruction decoded by the decoder 20 is an unconditional branch instruction. The circuit 36 also selects the register 32 if the instruction executed by the unit 22 is a conditional branch instruction that, when it is executed, causes a jump of a plurality of instructions of the machine code. To this end, the circuit 36 receives, on the one hand, a signal $S_{20}$ generated by the decoder 20 and, on the other hand, a signal $S_{22}$ generated by the unit 22. The signal $S_{20}$ allows the circuit 36 to identify the instruction that has just been decoded by the decoder 20 and therefore to identify whether it is an unconditional branch instruction. For example, the signal $S_{20}$ contains the opcode of the instruction that has just been decoded.

The signal $S_{22}$ takes a particular value when the unit 22 has just executed a conditional branch instruction the condition of which was met. In this case, this causes a jump of a plurality of instructions of the machine code. In contrast, when this signal $S_{22}$ does not take this particular value, this means that the condition of the conditional branch instruction was not met. In the latter case, the next instruction executed by the microprocessor is the instruction that immediately follows this conditional branch instruction in the machine code.

When the circuit 36 selects the register 32, then it controls the multiplexer 34 so that the latter delivers, to its output, the content of the register 32, i.e. the mask MJ. In contrast, when the circuit 36 selects the register 30, it is the mask $M_i$ that is delivered to the output of the multiplexer 34.

Figure 3:
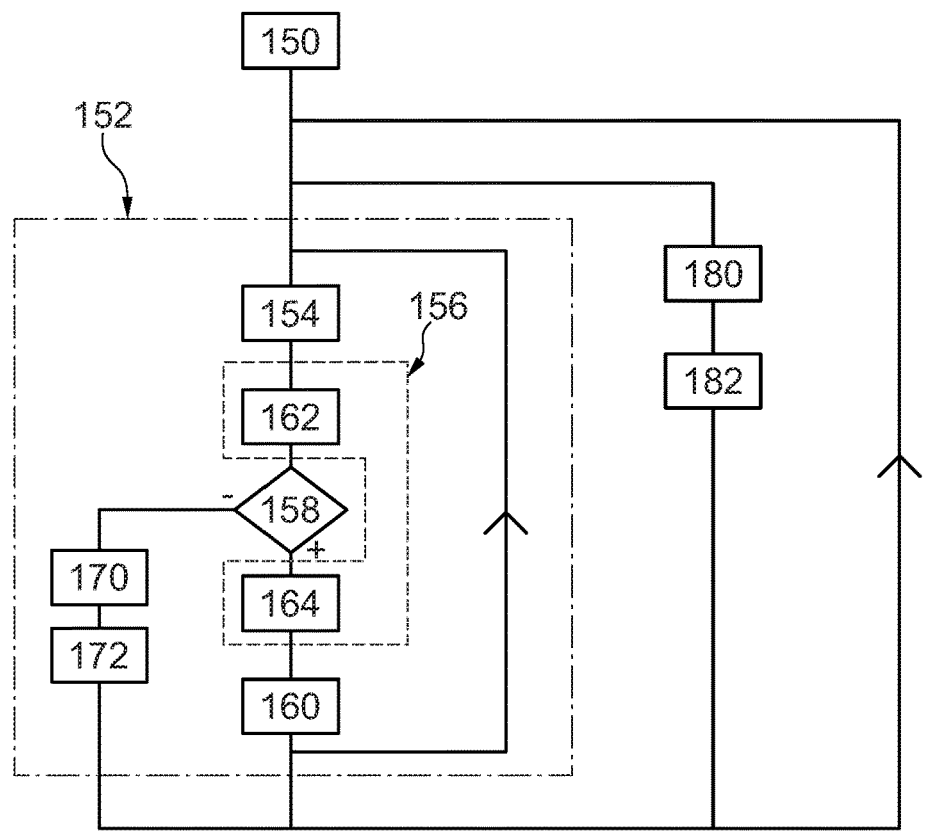
FIG. 3 is a flow chart of a method for executing the machine code using the processing pipeline of FIG. 2.

FIG. 3 shows a method for executing the binary code 30 by means of the microprocessor 2.

The method starts with a step 150 of providing the binary code 30 to the memory 4. To do this, for example, the microprocessor 2 copies the copy 40 to the memory 4 in order to obtain the binary code 30 stored in the memory 4. Beforehand, this binary code 30 will have been generated by the compiler of FIG. 4. During compilation, each cleartext instruction $I_i$ of a machine code will have been converted into a corresponding masked instruction $I^*_i$ using a masking function $F_M(\ )$. The function $F_M(\ )$ is the inverse of the function $F_D(\ )$, i.e. it respects the following relationship: $I_i=F_D(F_M(I_i))$. The function $F_M(\ )$ is defined by the following relationship: $I^*_i=F_M(I_i; M_c)$, where $M_c$ is the same current mask as that which will be used, by the module 28, in execution of this machine code 32 to unmask the instruction $I^*_i$. More precisely, in this example, the function $F_M(\ )$ is defined by the following relationship: $I^*_i=I_i$ XOR $M_c$. One example of embodiment of the function $F_M(\ )$ is described in more detail with reference to FIG. 4.

Next, in a phase 152, the microprocessor 2 executes the binary code 30 and, in particular, the machine code 32.

To do this, for each instruction $I^*_i$ pointed to by the program counter 26, the pipeline 10 successively executes the following steps:

a step 154 of loading, by means of the loader 18, the instruction $I^*_i$ pointed to by the current value of the program counter 26, then a step 156 of unmasking, by means of the module 28, the loaded instruction $I^*_i$ to obtain the cleartext instruction $I_i$, then a step 158 of decoding, by means of the decoder 20, the cleartext instruction $I_i$, then a step 160 of executing, by means of the unit 22, the decoded instruction $I_i$.

Steps 154, 158 and 160 are typically each executed in one clock cycle. In addition, they may be executed in parallel for various successive instructions of the machine code 32. Thus, the pipeline 10 is able to execute in parallel:

step 154 for an instruction $I^*_{i+1}$, step 158 for an instruction $I_i$, and step 160 for an instruction $I_{i-1}$.

Thus, the pipeline 10 allows one instruction to be executed per clock cycle. However, as indicated above, there are situations in which it is necessary to suspend execution of steps 154 and 158 for a plurality of clock cycles. In this case, the signal $S_F$ is set to "1" throughout the clock cycles in which execution of steps 154 and 158 is suspended.

At the end of step 158 of decoding the instruction $I_i$, the decoder 20 transmits to the circuit 36 the signal $S_{20}$. This signal $S_{20}$ makes it possible to detect whether the instruction $I_i$ that has just been decoded is an unconditional branch instruction.

In addition, in step 158, if an instruction $I_i$ cannot be decoded because its syntax is incorrect, the method continues with a step 170 of signalling an execution fault. In step 170, the decoder 20 triggers signalling of an execution fault.

In response to such signalling, in a step 172, the microprocessor 2 implements one or more countermeasures. A wide range of countermeasures are possible. The countermeasures implemented may have very different degrees of severity. For example, the countermeasures that are implemented may range from simply displaying an error message without interrupting the normal execution of the machine code 32 to definitively disabling the microprocessor 2. The microprocessor 2 is considered to be disabled when it is definitively put into a state in which it is incapable of executing any machine code. Between these extreme degrees of severity, there are many other possible countermeasures, such as:
- indicating via a human-machine interface detection of the faults,
- immediately interrupting the execution of the machine code 32 and/or reinitializing it, and
- deleting the machine code 32 from the memory 4 and/or deleting the backup copy 40 and/or deleting the secret data.

In step 160, if the executed instruction is a conditional branch instruction and if execution of this instruction causes a jump of a plurality of instructions, then the unit 22 generates a signal $S_{22}$ that indicates to the circuit 36 that execution of this conditional branch instruction has caused a jump of a plurality of instructions.

To do this, typically, during execution of the conditional branch instruction, a condition is tested. If this condition is not met, execution of this conditional branch instruction causes no instruction jump. In this case, the program counter is simply incremented by a unit increment, i.e. by a single instruction. It is therefore the following instruction $I_{i+1}$ of the machine code 32 that is executed. In this case, the signal $S_{22}$ for example remains equal to "0".

If in contrast, the condition of the conditional branch instruction is met, execution of this instruction by the unit 22 causes a jump of a plurality of instructions of the machine code 32. In this case, typically, a new value is written to the register containing the program counter. The difference between this new value and the previous value is larger than a plurality of times the unit increment of the program counter. In the latter case, the signal $S_{22}$ for example takes the value "1".

Step 156 is executed between the end of execution of step 158 for the instruction $I_i$ and before the start of execution of step 158 for the next instruction $I_p$. The next instruction $I_p$ is:
- either the following instruction $I_{i+1}$ when execution of the instruction $I_i$ does not cause a jump of a plurality of instructions,
- or another instruction of the machine code, different from the instruction $I_{i+1}$, when execution of the instruction $I_i$ causes a jump of a plurality of instructions.

Step 156 mainly comprises an operation 164 of constructing the mask $M_i$ and an operation 162 of unmasking the next instruction $I_p$ loaded by the loader 18.

Operation 164 is executed each time the decoder 20 finishes decoding an instruction and, at the same time, the signal $S_F$ is equal to "0".

In operation 164, the module 28 stores, in the register 30, the values of a predetermined set of configuration signals of the decoder 20. Preferably, this set of configuration signals contains:
- the signal that codes the opcode of the instruction $I_i$ that has just been decoded, and
- the signals that code the values of the operands of the instruction $I_i$.

Here, storage of these configuration signals is triggered, for example, each time a clock signal ends unless the signal $S_F$ is equal to "1". Thus, a new mask $M_i$ is constructed each time a new instruction $I_i$ is decoded by the decoder 20. This new mask $M_i$ varies as a function of the decoded instruction and, in particular, as a function of its opcode and of the values of its operands. Given that the instructions decoded one after another are generally different, the constructed mask $M_i$ is different on each execution of operation 164.

In the case where the signal $S_F$ is equal to "1", no new configuration signal is stored in the register 30 and hence the register 30 contains the value of the last mask $M_i$ constructed.

Operation 162 is executed each time the decoder 20 decodes a new loaded instruction $I^*_p$. It will be recalled here that, since each instruction of the machine code 32 is masked, loaded instructions are masked.

In operation 162, the circuit 36 first selects, from the masks $M_i$ and MJ, which are stored in the registers 30 and 32, the mask that must be used as current mask $M_c$. More precisely, the circuit 36 selects the mask MJ only in the following two cases:
- case 1: the signal $S_{20}$ corresponds to the signal generated when the instruction $I_i$ that has just been decoded by the decoder 20 is an unconditional branch instruction, and
- case 2: the received signal $S_{22}$ is equal to "1", this meaning that the branch instruction $I_i$ that has just been executed by the unit 22 caused a jump of a plurality of instructions.

In any case other than the above two, the circuit 36 systematically selects the mask $M_i$. Here, to select the mask MJ, the circuit 36 controls the multiplexer 34 so that it delivers, to its output, the content of the register 32. Similarly, to select the mask $M_i$, the circuit 36 controls the multiplexer 34 to deliver, this time round, the content of the register 30 to its output. Thus, the output of the multiplexer 34 delivers the current mask $M_c$.

Next, the gate 38 executes the unmasking function $F_D(I^*_p; M_c)$. Here, to do this, the gate 38 "XOR's" the bits of the mask $M_c$ delivered to the output of the multiplexer 34 and the corresponding bits of the loaded instruction $I^*_p$ delivered by the loader 18 at the same time. The result of the function $F_D(\ )$, i.e. the cleartext instruction $I_p$, is delivered to the input of the decoder 20, to be decoded in the next clock cycle.

Thus, when the decoded instruction $I^*_i$ is not a branch instruction, the next instruction $I^*_p$ is unmasked using the mask $M_i$, i.e. using a mask the value of which depends on the value of the previous instruction $I_i$ decoded. If at that point, the decoder 20 is subjected to a fault attack such that the configuration signals generated do not correspond to those expected, i.e. to those corresponding to correct decoding of the instruction $I_i$, then the module 28 constructs a mask $M_D$ that is different from the expected mask $M_i$. This mask $M_D$ is then used to unmask the next instruction $I^*_p$. As the mask $M_D$ is different from the expected mask $M_i$, the unmasked instruction $I_{D+1}$ obtained is different from the expected cleartext instruction $I_p$. There are then two particular cases:
- Case 1: The instruction $I_{D+1}$ is an instruction the syntax of which is incorrect. In this case, the method continues with step 170.
- Case 2: The instruction $I_{D+1}$ is an instruction the syntax of which is correct. In this second case, decoding of the instruction $I_{D+1}$ causes no error and the module 28 constructs a new mask $M_{D+1}$ from the configuration signals generated in response to decoding of this instruction $I_{D+1}$. Since the decoded instruction $I_{D+1}$ is different from the expected instruction $I_p$, the constructed mask $M_{D+1}$ is different from the expected mask $M_p$. Hence, execution of operation 162 generates an instruction $I_{D+2}$ different from the expected instruction $I_{p+1}$. At this stage, as has just been described above, the syntax of this instruction $I_{D+2}$ may either be correct or incorrect. Now, it is practically certain that after a certain number of clock cycles, the instruction decoded by the decoder 20 will be an instruction the syntax of which is incorrect. It is therefore certain that after a certain number of clock cycles, an execution fault will be signalled.

When an instruction $I_i$ is the destination of a branch instruction, i.e. it is located at a branch address, there are two paths that may be taken to reach this instruction $I_i$. The first path reaches the instruction $I_i$ by a jump of a plurality of instructions when an unconditional branch instruction is executed or when the condition of a conditional branch instruction is met. The second path corresponds to the case where instruction $I_{i-1}$ is executed then the program counter incremented by the unit increment. Depending on the path taken, the instruction executed by the microprocessor just before execution of instruction $I_i$ is not the same. When the first path is taken, the previous instruction is a branch instruction. When the second path is taken, the previous instruction is the instruction $I_{i-1}$.

Here, during compilation, before each instruction I; that is located at a branch address, an unconditional branch instruction is inserted. This unconditional branch instruction causes, when it is executed by the microprocessor 2, a jump of one instruction, i.e. the value of the program counter is replaced by a value incremented by a unit increment. Thus, in the case of the machine code 32 generated by such a compiler, the instruction $I_{i-1}$ that precedes the instruction $I_i$ is systematically an unconditional branch instruction that causes a jump to the instruction $I_i$ when it is executed by the unit 22.

Thus, whatever the path taken to reach the instruction the instruction executed just before this instruction $I_i$ is a branch instruction. In the case where it is the first path that is taken, the branch instruction may be an unconditional branch instruction or a conditional branch instruction. Here, the unconditional branch instruction is detected by the circuit 36 based on the signal $S_{20}$ generated by the decoder 20. In the case of a conditional branch instruction, the fact that its execution causes a jump of a plurality of instructions is detected based on the signal $S_{22}$ generated by the unit 22. It will be noted that in the latter case, after the conditional branch instruction has been decoded, operation of the loader 18 and of the decoder 20 is suspended. Specifically, until the conditional branch instruction is executed by the unit 22, it is not possible to know whether the condition is met or not and therefore to know which instruction will be loaded by the loader 18 next. Thus, operation of the loader 18 restarts solely after the conditional branch instruction has been executed, i.e. at a time at which the address of the next instruction $I_p$ to be executed is known.

The branch instruction executed when the first path is taken is different from the branch instruction executed when the second path is taken. However, in both cases, the circuit 36 selects the mask MJ as current mask $M_c$ to be used to unmask the instruction $I_i$. As this mask MJ is the same for all the branch instructions, the instruction $I^*_i$ may be correctly unmasked whatever the path taken to reach this instruction.

Execution of the machine code 32 may be interrupted for a plurality of clock cycles. For example, this occurs when execution of the machine code 32 is interrupted to execute, instead, another machine code. In this case, in a step 180, the microprocessor 2 saves, to the set 12 or to the memory 4, the execution context of the machine code 32. The execution context comprises all the information required for the microprocessor 2 to be able to subsequently restart execution of this machine code 32 at the location of the instruction where its execution stopped. Step 180 in particular comprises saving the current value of the mask $M_i$ contained in the register 30 and of the current mask selected by the circuit 36.

After a plurality of clock cycles, execution of the machine code 32 by the microprocessor 2 is restarted from the location of the instruction where this execution was interrupted. At this point, in a step 182, the execution context is restored. This step 182 in particular comprises writing, to the register 30, the mask $M_i$ saved in step 180. It also comprises restoring the state of the circuit 36 so that the latter selects the same mask $M_c$ as that which would have been selected if execution of the machine code 32 had not been interrupted. When the interruption of execution of the machine code 32 is caused by the need to execute another machine code, in this case, this other machine code is executed between steps 180 and 182.

The same principle of saving the mask $M_i$ and the state of the circuit 36 is employed when the interruption of execution of the machine code 32 is caused by a hardware interruption.

Figure 4:
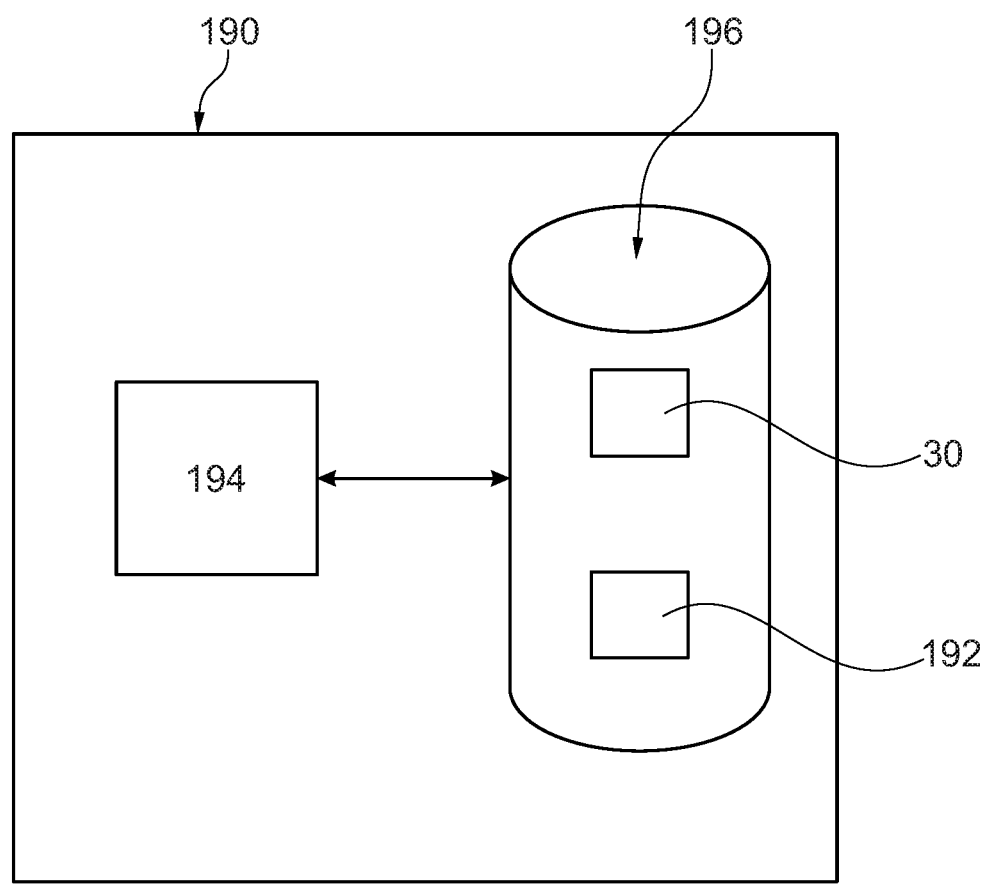
FIG. 4 is a schematic illustration of a compiler able to generate the machine code executed by the apparatus of FIG. 1.

FIG. 4 shows a compiler 190 able to automatically generate the machine code 32 from a source code 192. To this end, the compiler 190 typically comprises a programmable microprocessor 194 and a memory 196. The memory 196 contains the instructions and data required to automatically generate, when they are executed by the microprocessor 194, the machine code 32 from the source code 192. In particular, compilation of the source code 192 comprises the following steps:

a) the compiler carries out an initial compilation of the source code 192 to obtain a cleartext machine code in which the instructions $I_i$ are not masked, then b) the compiler 190 notes, in the cleartext machine code, instructions that are located at a branch address, then c) before each of these noted instructions, the compiler 190 automatically inserts an unconditional branch address that, when it is executed by the microprocessor 2, causes a jump to the noted instruction, then d) the compiler generates the machine code 32, i.e. a machine code in which each instruction $I_i$ has been replaced by the corresponding masked instruction $I^*_i$.

Step c) consists in replacing each implicit branch instruction with an explicit branch instruction. Thus, following step c), the instruction executed before each noted instruction is systematically a branch instruction.

For example, to carry out step d), the compiler parses the machine code obtained at the end of step c) in ascending order of the instructions $I_i$. For each cleartext instruction $I_i$ encountered, it constructs the mask $M_c$ to be used to obtain the corresponding masked instruction $I^*_i$. The mask $M_c$ constructed by the compiler 190 is the same as the mask constructed by the module 28 to unmask the instruction $I^*_i$ on execution of the machine code by the microprocessor 2. To do this, for example, the compiler 190 implements a software emulator that reproduces the operation of the pipeline 10 and, in particular, of the decoder 20 and of the module 28. For example, for each instruction $I_{i+1}$ of the cleartext machine code:

the emulator selects, as mask $M_c$, the mask MJ if the previous instruction $I_i$ is a branch instruction, else the emulator produces configuration signals that are the same as those generated by the decoder 20 when it has finished decoding the previous instruction then it constructs the mask $M_i$ from these signals, the constructed mask $M_c$ then being equal to the constructed mask $M_i$.

Once the mask $M_c$ has been constructed, the compiler 190 obtains the masked instruction $I^*_{i+1}$ using the relationship $I^*_{i+1}=F_M(I_{i+1}; M_c)$, i.e. in this example using the following relationship: $I^*_{i+1}=I_{i+1}$ XOR $M_c$.

Section III: Variants

Variants of the Apparatus:

The memory 4 may also be a non-volatile memory. In this case, it is not necessary to copy the binary code 30 to this memory before launching its execution since it is already stored therein.

As a variant, the memory 4 may also be an internal memory integrated into the microprocessor 2. In the latter case, it is produced on the same substrate as the other elements of the microprocessor 2. Lastly, in other configurations, the memory 4 is composed of a plurality of memories certain of which are internal memories and others of which are external memories.

Variants of the Masking and Unmasking Operations:

In one simplified embodiment, the mask $M_i$ is constructed solely from the configuration signal that codes the opcode of the instruction $I_i$ or solely from the configuration signal that varies as a function of the one or more values of the operands of the instruction $I_i$.

Other functions $F_D(\ )$ are possible. For example, the function $F_D(\ )$ is defined by the following relationship: $i_i=i^*_i$ modulo $M_c$, where "modulo" is the modular-arithmetic operation that associates, with a pair (a, b) of integers, the remainder of the Euclidean division of a by b. The function $F_D$ may also be defined by the following relationship: $i_i=i^*_i$ XOR $M_c$ XOR $k_s$, where $k_s$ is a secret key known only to the microprocessor 2. If computational power allows, the function $F_D(\ )$ may also be an encryption function, a symmetric encryption function for example. In the latter case, the mask $M_c$ is then what is better known as a "decryption key". Each time the function $F_D(\ )$ is modified, the function $F_M(\ )$ must be changed accordingly.

The function $F_D(\ )$ may be different depending on whether the mask used to unmask the next instruction $I^*_p$ is the mask MJ or the mask $M_i$. For example, when the mask MJ is selected, the function "XOR" is replaced by another function, such as a decryption function that uses the bits of the mask MJ to decrypt the instruction $I^*_p$. The emulator of the compiler 190 must then be changed to take this replacement into account.

In the case of a machine code devoid of branch instructions, the mask MJ and its use are omitted.

As a variant, only certain instructions of the machine code are masked. For example, to do this, a specific instruction is added to the instruction set of the microprocessor 2. When this specific instruction is executed by the unit 22, it indicates to the microprocessor that the next T instructions are not masked instructions and need not therefore be unmasked. Typically, the number T is an integer number higher than or equal to 1 or 10 or 100.

According to another variant, it is a specific bit of a control or status register of the microprocessor 2 that indicates whether the loaded instruction is or is not a masked instruction. More precisely, when this specific bit takes a predetermined value, the loaded instruction is unmasked by the module 28. If this specific bit takes a value different from this predetermined value, then the loaded instruction is not unmasked by the module 28.

The various embodiments described here may be combined together.

Section IV: Advantages of the Described Embodiments

The embodiments described here allow signalling of an execution fault to be triggered in case of modification of an instruction, of instructions being skipped or of an error in decoding the instruction. Such an execution fault is also signalled if the execution of a conditional branch instruction is disrupted. Specifically, in this case, the mask $M_c$ used to unmask the next instruction $I^*_p$ is not the right one since, following execution of the previous conditional branch instruction, the intended path was not followed. Thus, the described method also allows a compromisation of the control flow to be detected.

The embodiments described here also have the following advantages:
- the module 28 is simple to implement,
- the extra cost in terms of size of the machine code is very low since only additional unconditional branch instructions are added to the machine code,
- the fact that the instructions of the machine code are unmasked only before they are decoded increases the robustness of the microprocessor 2 to side-channel attacks, and
- the instructions of the machine code are not stored in cleartext in the main memory, this making disassembly of this machine code more difficult.

Using the mask MJ as current mask $M_c$ each time the previous instruction is a branch instruction allows the described method to be implemented even in the case where the machine code comprises branch instructions.

Storing the constructed mask $M_i$ in the register 30 while execution of the loader 18 and of the decoder 20 is suspended allows the described method to be implemented even if operation of the loader 18 and of the decoder 20 is suspended for a plurality of clock cycles.

Saving the constructed mask $M_i$ in case of interruption of execution of the machine code allows execution of this machine code to be interrupted then to be restarted subsequently.

The fact that the function $F_D(\ )$ is a simple "EXCLUSIVE OR" gate simplifies and accelerates unmasking.

The invention claimed is:

1. A method for executing a machine code using a microprocessor comprising a hardware pipeline for processing instructions, the hardware processing pipeline comprising an instruction loader, a decoder and an arithmetic logic unit, the method comprising, for each instruction of the machine code to be executed, successively:
   loading, using the instruction loader, an instruction designated by a program counter, to obtain a loaded instruction, then
   decoding the loaded instruction, using the decoder, to generate signals that configure the microprocessor to execute the loaded instruction, then,
   executing, using the arithmetic logic unit, the loaded instruction,
   wherein the method also comprises:
   after decoding a current loaded instruction and before the operation of executing, using the arithmetic logic unit, the loaded instruction, constructing a value of a mask from signals generated by the decoder in response to decoding of the current loaded instruction, the constructed mask thus varying as a function of the current loaded instruction in order to obtain a constructed mask, then
   before decoding a next loaded instruction, unmasking the next loaded instruction using the constructed mask
   wherein:
   in response to detection that a loaded instruction is a branch instruction that, when executed by the arithmetic logic unit, replaces a value of a program counter with a new value, the new value depending on operands of the branch instruction, the method comprises unmasking the next loaded instruction using a pre-recorded jump mask that is constant and identical for all branch instructions executed by the microprocessor, and in response to an absence of detection that the loaded instruction is a branch instruction, the method comprises unmasking the next loaded instruction using the constructed mask.

2. The method according to claim 1, wherein the method comprises:

suspension of execution of the decoding operation for one or more cycles of a clock of the microprocessor, and in response to suspension of the execution of the decoding operation, the method comprises storing the constructed mask in a register, and when execution of the decoding operation restarts, the next loaded instruction is unmasked using the constructed mask stored in the register.

3. The method according to claim 1, comprising:

in response to interruption of the execution of a first machine code, and to triggering of execution of a second machine code, saving an execution context of the first machine code, wherein saving the execution context of the first machine code comprises saving the constructed mask, then in response to restart of the execution of the first machine code, and to interruption of the execution of the second machine code, restoring the execution context of the first machine code, wherein restoring the execution context of the first machine code comprises writing, to a register of the microprocessor, the saved constructed mask, then unmasking the next loaded instruction following the restart of the execution of the first machine code using the constructed mask written to the register.

4. The method according to claim 1, wherein unmasking the instruction loaded using the constructed mask comprises XORing bits of the loaded instruction and bits of the constructed mask.

5. The method according to claim 1, wherein the signals generated by the decoder in response to decoding of the current loaded instruction are signals that vary as a function of an opcode of the current loaded instruction.

6. A microprocessor, comprising a hardware pipeline for processing instructions, the hardware processing pipeline comprising an instruction loader, a decoder and an arithmetic logic unit, the hardware processing pipeline being configured, for each instruction of machine code to be executed, to successively execute:

loading, using the instruction loader, an instruction designated by a program counter, to obtain a loaded instruction, then decoding the loaded instruction, using the decoder, to generate signals that configure the microprocessor to execute the loaded instruction, then, executing, using the arithmetic logic unit, the loaded instruction, wherein the hardware processing pipeline also comprises a hardware demasking module configured to:

after decoding a current loaded instruction and before the operation of executing, using the arithmetic logic unit, the loaded instruction, constructing a value of a mask from signals generated by the decoder in response to decoding of the current loaded instruction, the constructed mask thus varying as a function of the current loaded instruction in order to obtain a constructed mask, then before decoding the next loaded instruction, unmasking a next loaded instruction using the constructed mask, wherein:

in response to detection that a loaded instruction is a branch instruction that, when executed by the arithmetic logic unit, replaces a value of a program counter with a new value, the new value depending on operands of the branch instruction, the hardware processing pipeline executes unmasking the next loaded instruction using a pre-recorded jump mask that is constant and identical for all branch instructions executed by the microprocessor, and in response to an absence of detection that the loaded instruction is a branch instruction, the hardware processing pipeline executes unmasking the next loaded instruction using the constructed mask.

* * * * *